US007249846B2

(12) United States Patent
Grand et al.

(10) Patent No.: US 7,249,846 B2
(45) Date of Patent: Jul. 31, 2007

(54) EYEWEAR WITH AN IMAGE PROJECTED OFF OF AN UNASSISTED EYEWEAR LENS TO THE USER

(76) Inventors: Joseph B. Grand, 2907 Shelter Island Dr., Suite 105-169, San Diego, CA (US) 92106; David M. Morelock, 7107 NE. 159th St., Kenmore, WA (US) 98028; Gil David Manalo, 15839 NE. 98th Way, Apt. B839, Redmond, WA (US) 98052; Ricardo Antonio Cruz, 13979 Glencliff Way, San Diego, CA (US) 92130

( * ) Notice: Subject to any disclaimer, the term of this patent is extended or adjusted under 35 U.S.C. 154(b) by 0 days.

(21) Appl. No.: 11/416,628

(22) Filed: May 3, 2006

(65) Prior Publication Data
US 2006/0250574 A1   Nov. 9, 2006

Related U.S. Application Data

(60) Provisional application No. 60/677,130, filed on May 3, 2005.

(51) Int. Cl.
*G02C 1/00* (2006.01)
(52) U.S. Cl. ...................................... 351/158; 359/630
(58) Field of Classification Search ................. 351/41, 351/158; 359/629, 630
See application file for complete search history.

(56) References Cited

U.S. PATENT DOCUMENTS 4,867,551 A * 9/1989 Perera ........................ 351/158
5,162,828 A * 11/1992 Furness et al. ............. 353/122

* cited by examiner

*Primary Examiner*—Huy Mai
(74) *Attorney, Agent, or Firm*—David L. Tingey

(57) ABSTRACT

A head mounted display (HMD) is worn on a user's head for displaying an image. A HMD is a personal see-through device designed to view still or video images or data that nonetheless permits the user to view his surroundings.

8 Claims, 13 Drawing Sheets

| CHARACTER | ACTUAL 7-SEGMENT DISPLAY | VIRTUAL 7-SEGMENT DISPLAY (AS SEEN BY THE USER IN THE REFLECTION) |
|---|---|---|
| 0 |  |  |
| 1 |  |  |
| 2 |  |  |
| 3 |  |  |
| 4 |  |  |
| 5 |  |  |

TO FIG. 10B

FROM FIG. 10A

| 6 |  |  |
| --- | --- | --- |
| 7 |  |  |
| 8 |  |  |
| 9 |  |  |
| A |  |  |
| b |  |  |
| C |  |  |

TO FIG. 10C

FROM FIG. 10B

| | | |
|---|---|---|
| d | 🔢⊕ | 🔢⊕ |
| E | 🔢⊕ | 🔢⊕ |
| F | 🔢⊕ | 🔢⊕ |
| g | 🔢⊕ | 🔢⊕ |
| H | 🔢⊕ | 🔢⊕ |
| J | 🔢⊕ | 🔢⊕ |
| L | 🔢⊕ | 🔢⊕ |

FROM FIG. 10C

| | | |
|---|---|---|
| P |  |  |
| U |  |  |
| y |  |  |
| . |  |  |
| - |  |  |

EYEWEAR WITH AN IMAGE PROJECTED OFF OF AN UNASSISTED EYEWEAR LENS TO THE USER

RELATED APPLICATION

This application claims the benefit of U.S. provisional patent application Ser. No. 60/677,130, filed on May 3, 2005, the entire disclosure of which is incorporated herein in its entirety.

TECHNICAL FIELD

This invention relates to providing an optical display system, and more particularly to head-mounted displays.

BACKGROUND INFORMATION

A head mounted display (HMD) is worn on a user's head for displaying an image. Generally, HMDs are configured as helmets or goggles, depending on how the display is to be worn. A HMD is a personal see-through device designed to view still or video images or data that nonetheless permits the user to view his surroundings.

The critical component of any HMD is the optical display system. Currently existing technologies, such as retinal direct projection, typically make use of expensive optics and mirrors and require high-resolution displays and expensive control circuitry.

SUMMARY

This current invention takes advantage of the optical characteristics of the lens already in place on a head-mounted unit (e.g., goggles) or eyeglasses, simplifying the design and allowing the invention to be used in a wide variety of consumer, low-cost applications. A reflective image display (RID) according to the present invention is designed to be an implant for virtually any head-worn device, protective or otherwise, that has a lens in the vicinity of the eyes. In preferred implementations, the RID comprises a small light-emitting display (LED) module or other backlit display technology supported by electronic circuitry to display information relevant to the viewer by reflecting the lit image from the inside of the lens. The LED or other display is mounted such that a vertical, horizontal, or a combination of vertical and horizontal mirror image is seen by the viewer. The viewed image is typically magnified by the curvature of the lens and appears to float 'in thin air' on the outer side of the lens.

An advantage of the RID invention is its low-cost method of displaying information in any glasses or head-mounted unit.

For all purposes herein, the following shall apply. The term "eyeglasses" and the term "goggles" are used interchangeably and use of one shall be deemed to include the other and each shall be deemed to include all eyewear worn by a user in front of the user's eyes. Similarly, the term "display" and the term "projector" are used interchangeably and use of one shall be deemed to include the other and each shall be deemed to include all technology for producing an optical transmission of an image to the lens of the eyeglasses. Use of the term "arm" as pertains to said eyeglasses shall be deemed to include a strap and any other paraphernalia that holds the eyeglasses lens or lenses in place in front of the user's eyes. Use of the term "conventional lens" shall be deemed to mean a lens of normal manufacture such as may be found in conventional eyewear, such as normal eyeglasses and/or goggles that are readily available commercially, unassisted with add-on reflective surfaces. Reference to "inward of the eyeglasses" shall be deemed to mean to the user side of the eyeglasses when the eyeglasses are worn by the user. Reference to "directly to the user's eye" means without transmission through or reflected from any other optics.

BRIEF DESCRIPTION OF THE FIGURES

The foregoing discussion will be understood more readily from the accompanying drawings, in which.

DETAILED DESCRIPTION

Figure 1:
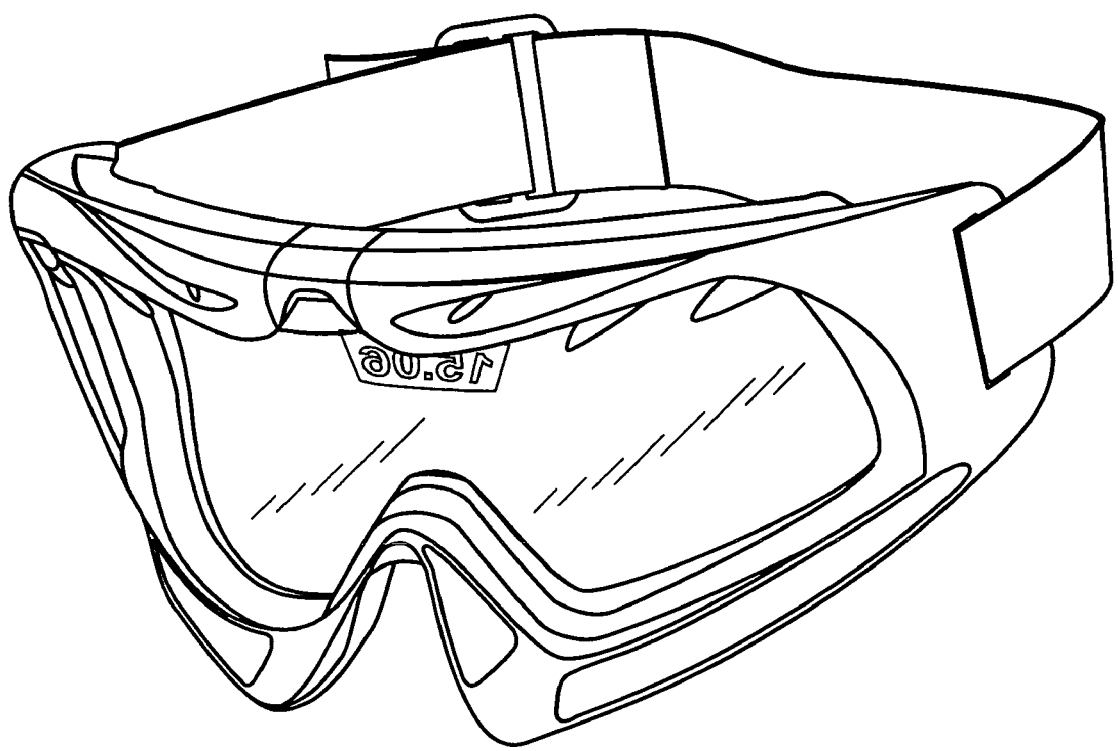
FIG. 1 and FIG. 2 are front and back perspective views, respectively, of a prototype embodiment of the present invention.

Although described herein with reference to headgear, and as useful when implemented with regard to projecting optical displays thereon, the systems and methods described below are applicable to any projection system in which the following systems and methods can be applied.

In one embodiment, a RID in accordance with the invention mounts inside symmetrical snowboarding or ski goggles with conventional lenses having a continuous curvature and arms or straps attached thereto for securing the lenses in front of the user's eyes and creates a visual display that utilizes the reflective quality of the goggle lens, producing an image which appears to float in space in front of the eyes. The RID can be used, for example, to display information such as the time of day or data (temperature, altitude, or number of runs) collected from sensors inside or outside the goggles. All user controls are desirably operated by a single button on the outside of the goggle that can be easily accessed without removing gloves or outer clothing. When enabled with a single pushbutton switch, the display illuminates to show, for example, the current time, current external temperature, or current altitude, depending on the mode, also selected by the user with the switch, when the display is not illuminating, it is slightly away of the user's field of vision and does not interfere with normal goggle use. The electrical components of the RID are preferably durable and capable of withstanding high-impact falls and severe temperatures. In some embodiments, the RID is water- and/or corrosion-resistant.

In one configuration, a microprocessor is used to control the electronic functionality of the device. A battery provides power to the system. Depending on the intended environment and capabilities of the invention, a variety of external sensors may be used to provide the user with relevant information. For example, an external pressure sensor can be used to measure pressure of the outside environment. The sensor produces a signal indicative of the sensed pressure and communicates the signal to the microprocessor, which converts it into an altitude reading displayed on the RID. Similarly, an external temperature sensor may be used to measure and communicate the temperature of the outside environment. The data from the pressure and temperature sensors may take the form of analog voltages, which the microprocessor converts into a textual form that can be displayed on, for example, a 7-segment LED display. The microprocessor program code may also contain functionality implementing a real-time clock, and when the proper mode is selected, causes the current time-of-day to appear on the display. The display may also provide chronographic (i.e., event duration), velocity, acceleration, and/or user heart rate information, Global Positioning System coordinates, of compass/directional information. The display may also show data received via wireless/radio frequency (RF) technologies.

As light passes through any change in medium such (as a glass window or lens) some light is transmitted, some light is absorbed, and some light is reflected. For this invention the reflective quality of the lens is utilized only when the display is in use or on. When the display is off—which typically is most of the time—the inside area of the goggle is darker than the surrounding area and little or no reflection can be seen from inside the goggle. This allows the goggle lens to be used in the usual fashion with no distractions. When the display is on, the light emitted from the display contrasts with the general darkness inside the goggle and thus can be viewed as a reflected image therein. In this embodiment, a lens of constant thickness is desirably used to minimize any bending of the light and simplify display calculations, which selectively distort the projected image to compensate for the distortion imposed by the lens. In other embodiments, e.g., use in connection with prescription lenses or lenses used for distance viewing, the thickness will not be constant. The bending outward of the lens on any axis causes the reflected image to distort and become larger on that axis, so it is desirable for the displayed image to itself be distorted in a compensatory fashion (so that the perceived image appears distortion-free). For example, an outward bending curvature along two axes (i.e., a spherical bend) causes the two-dimensional image to be magnified on both axes (as would a concave spherical mirror). The image also will undergo magnification as a function of lens curvature. The display is preferably mounted at a distance less than the focal length of the curved lens, and the viewing eye can be located inside or outside this focal length. The distance the image appears outside the lens is the same as the mounted distance between the lens and the display.

Figure 2:
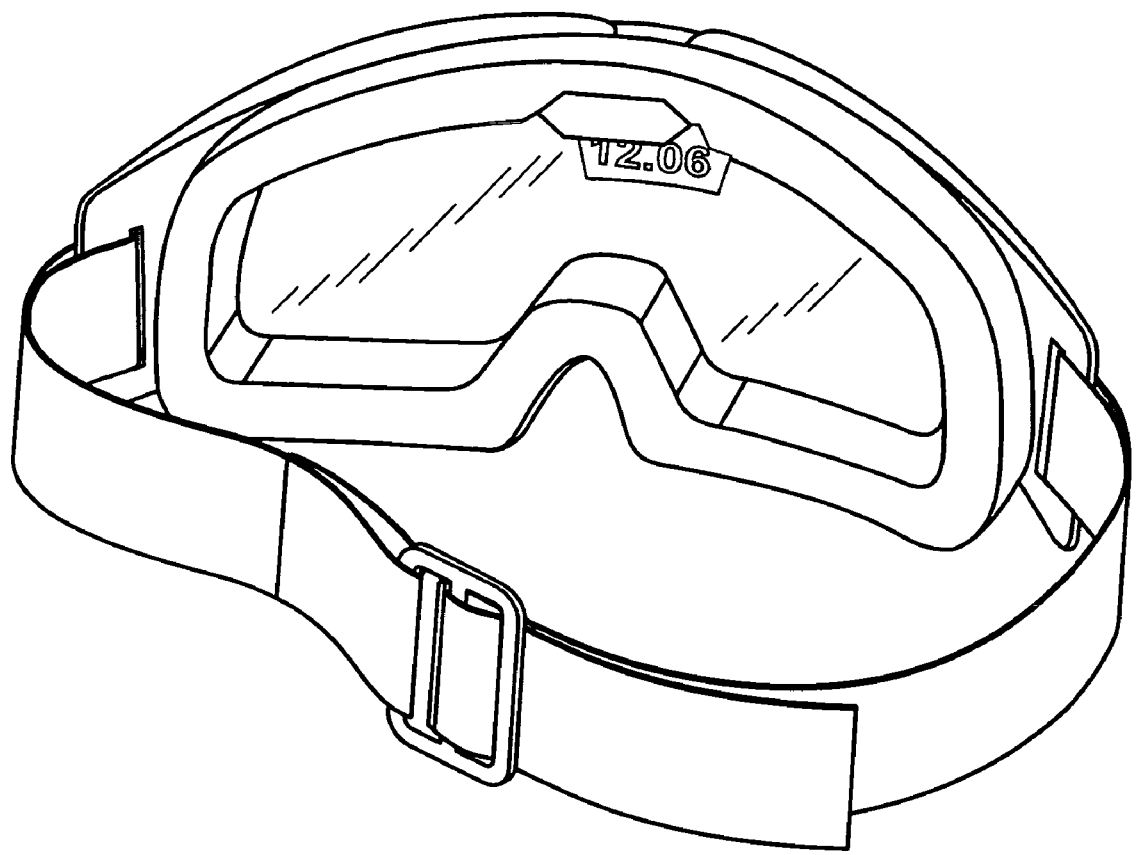

FIG. 1 and FIG. 2 are front and back perspective views, respectively, of a prototype embodiment of the present invention.

Figure 3:
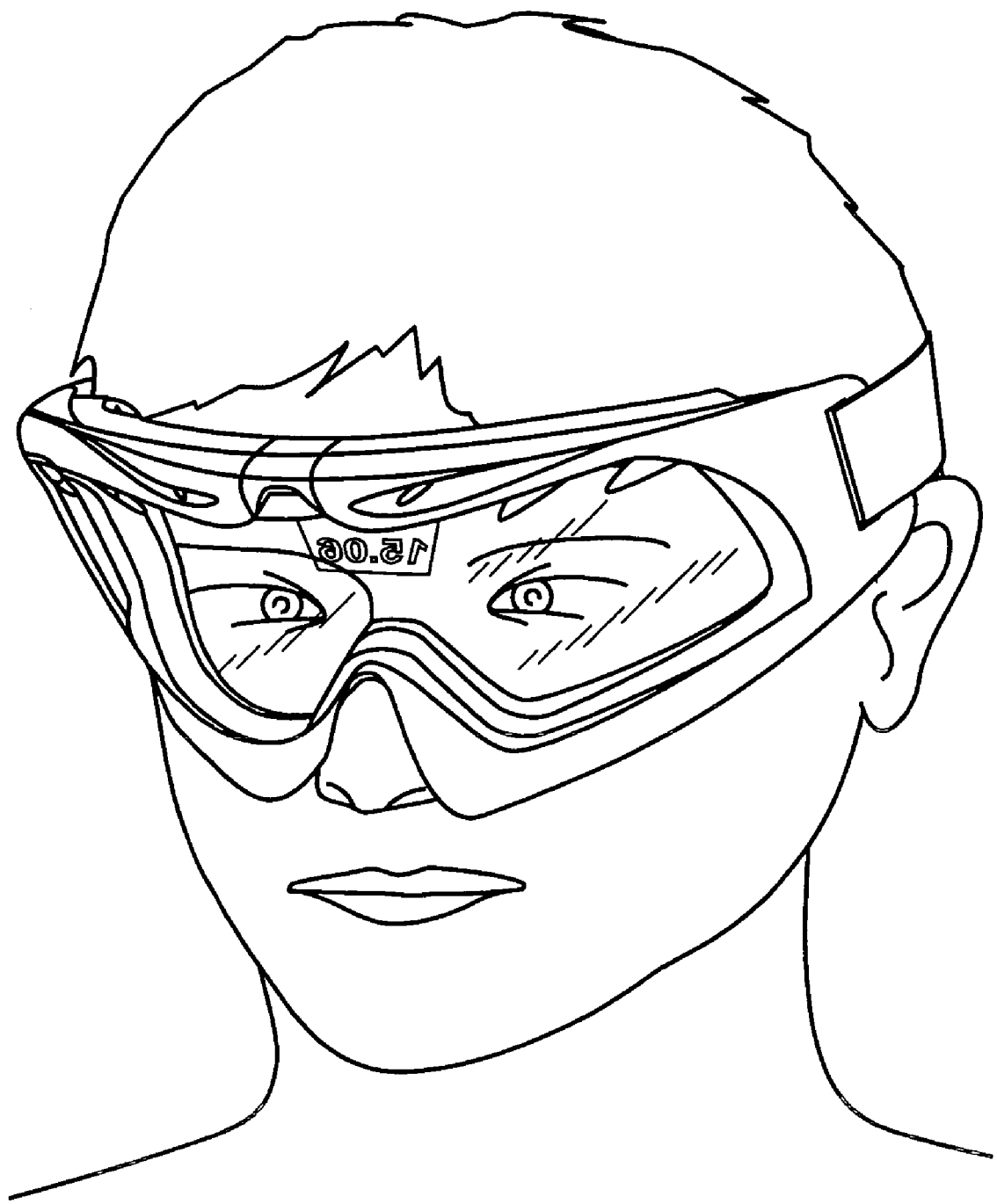
FIG. 3 and FIG. 4 are photographs of an embodiment of the present invention, front and back, respectively.
Figure 4:
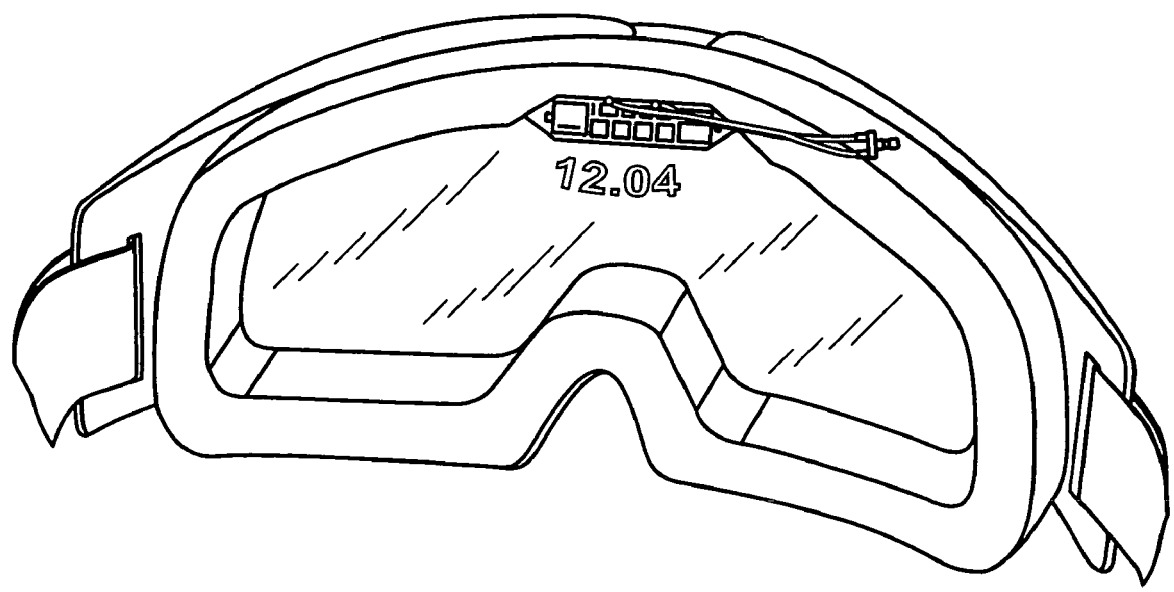

FIG. 3 and FIG. 4 are photographs of an embodiment of the present invention, front and back, respectively. This prototype embodiment uses a blue color, 0.2-inch wide, 4-character, 7-segment light-emitting diode display on a pair of ski/snowboard goggles.

Figure 5:
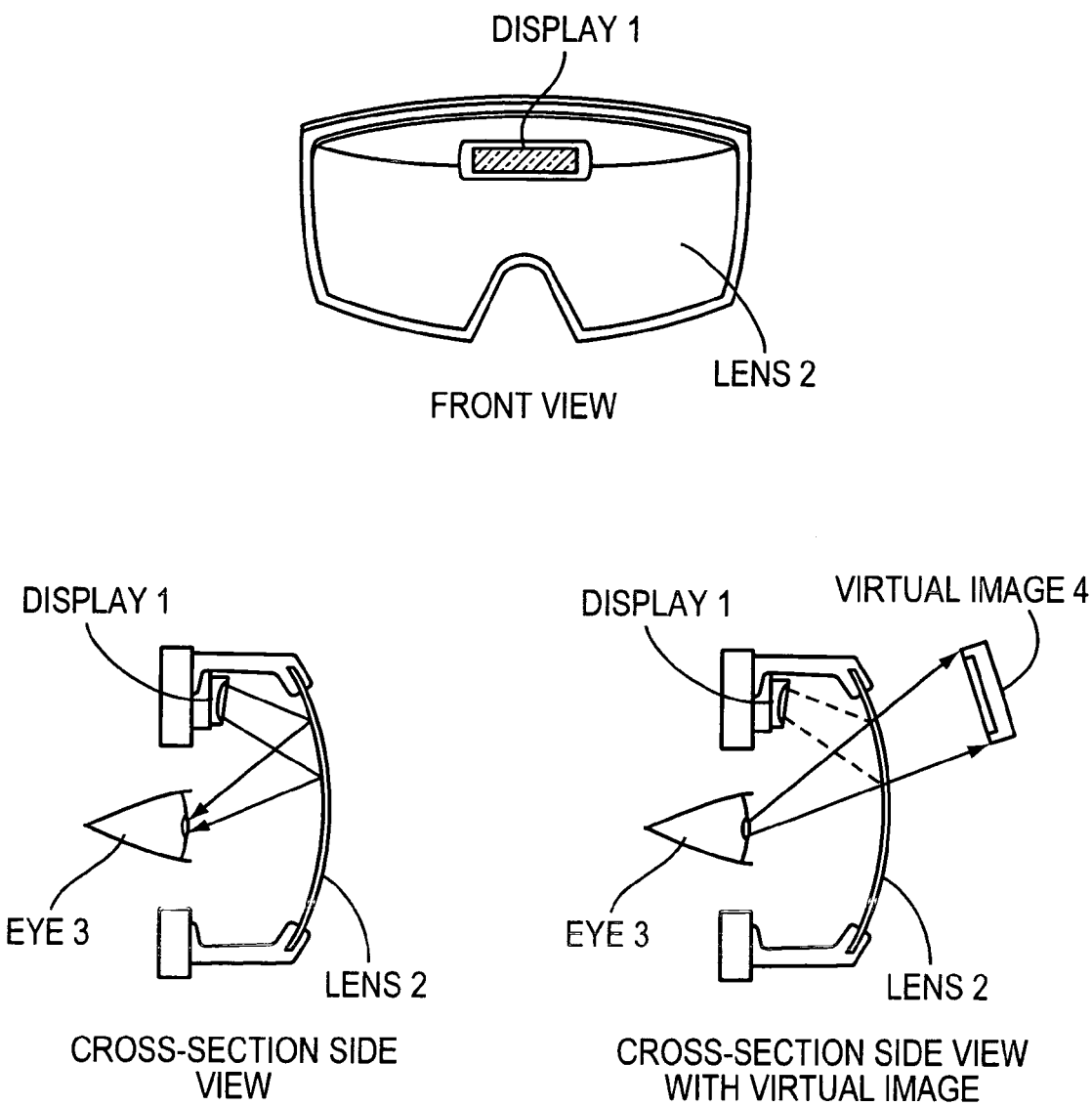
FIG. 5 schematically illustrates the optical and reflective characteristics of the present invention.

FIG. 5 schematically illustrates the optical and reflective characteristics of the present invention. Due to the optical characteristics of a curved lens, such as those used in ski/snowboard goggles, the virtual image (4) generated from the LED display (1) appears to float in front of the user's eye (3), but is of a size much larger than that of the original LED display. This allows the invention to use a small display that does not interfere with the ordinary usage of the eyeglasses or goggles while still providing a fully readable and useful display for text and data information. The illustrated embodiment has the display mounted on the top center of the goggles and the wearer will look upwards in order to see the image. Other locations of the display are also possible, depending on the intended application.

Figure 6:
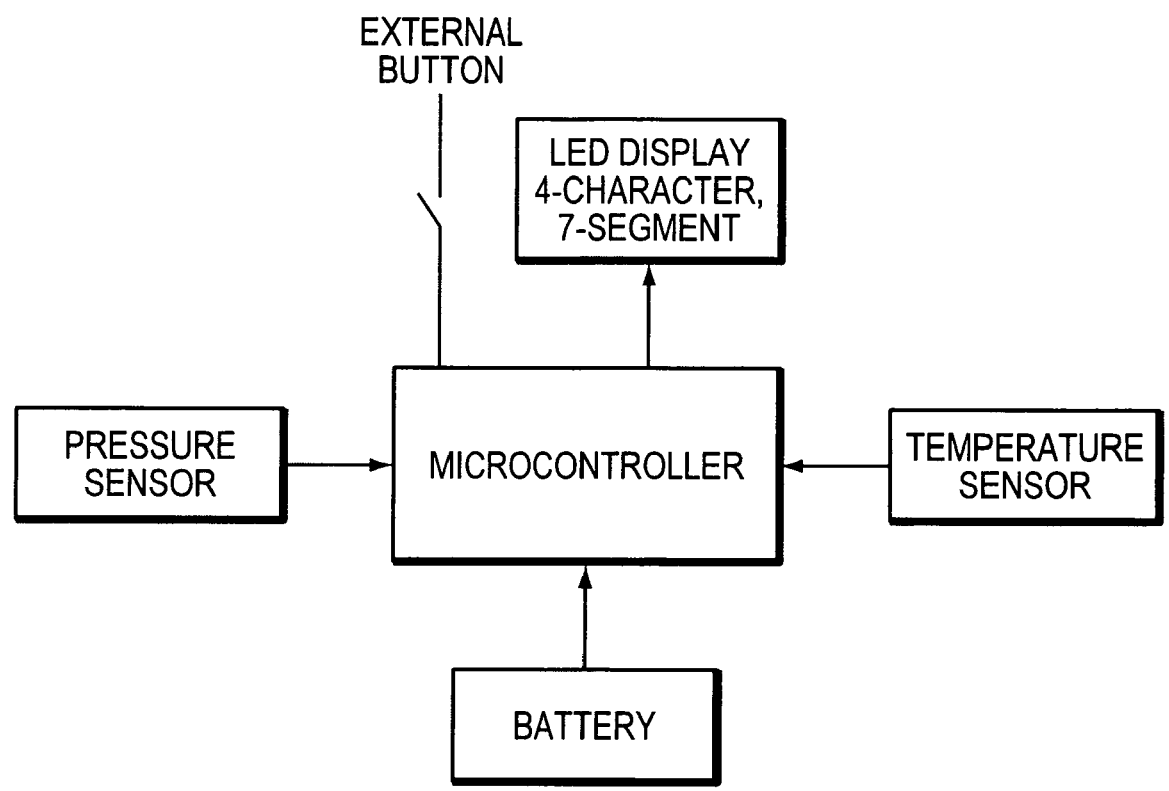
FIG. 6 is a block diagram of the embodiment as described above.

FIG. 6 is a block diagram of the embodiment as described above.

Figure 7:
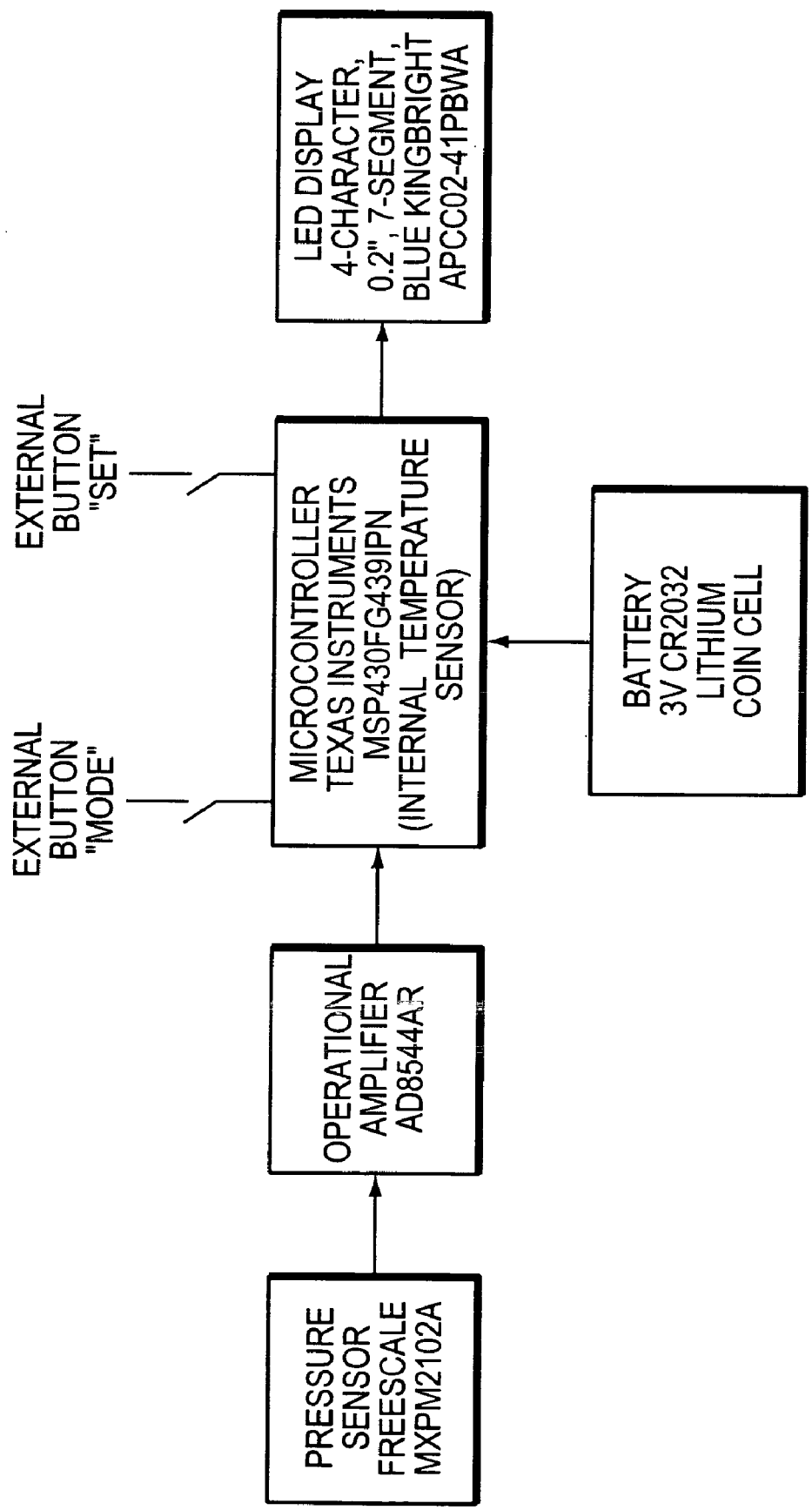
FIG. 7 schematically illustrates another implementation of the present invention.

FIG. 7 schematically illustrates an implementation of the present invention, showing the manner in which a pressure sensor communicates, via an operational amplifier, with a microprocessor (implemented as a programmable microcontroller) to effect the functionality described above. External control switches allowing the user to activate the display and toggle among modes are also illustrated.

Figure 8:
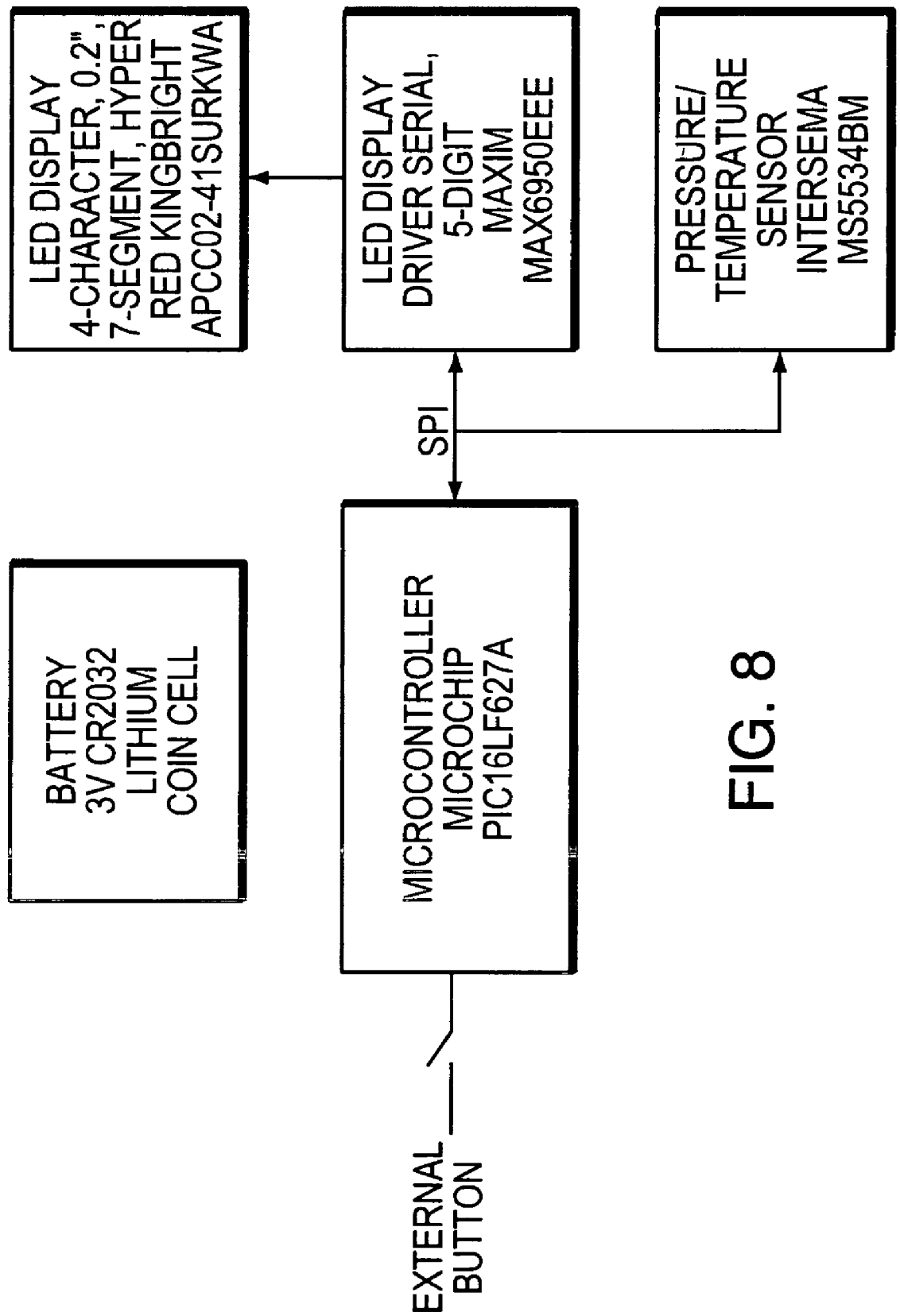
FIG. 8 schematically illustrates another implementation of the present invention.

FIG. 8 schematically illustrates another implementation of the present invention, showing the manner in which a pressure and temperature sensor communicates, via a serial peripheral interface link, with a microprocessor (implemented as a programmable microcontroller) to effect the functionality described above.

Figure 9:
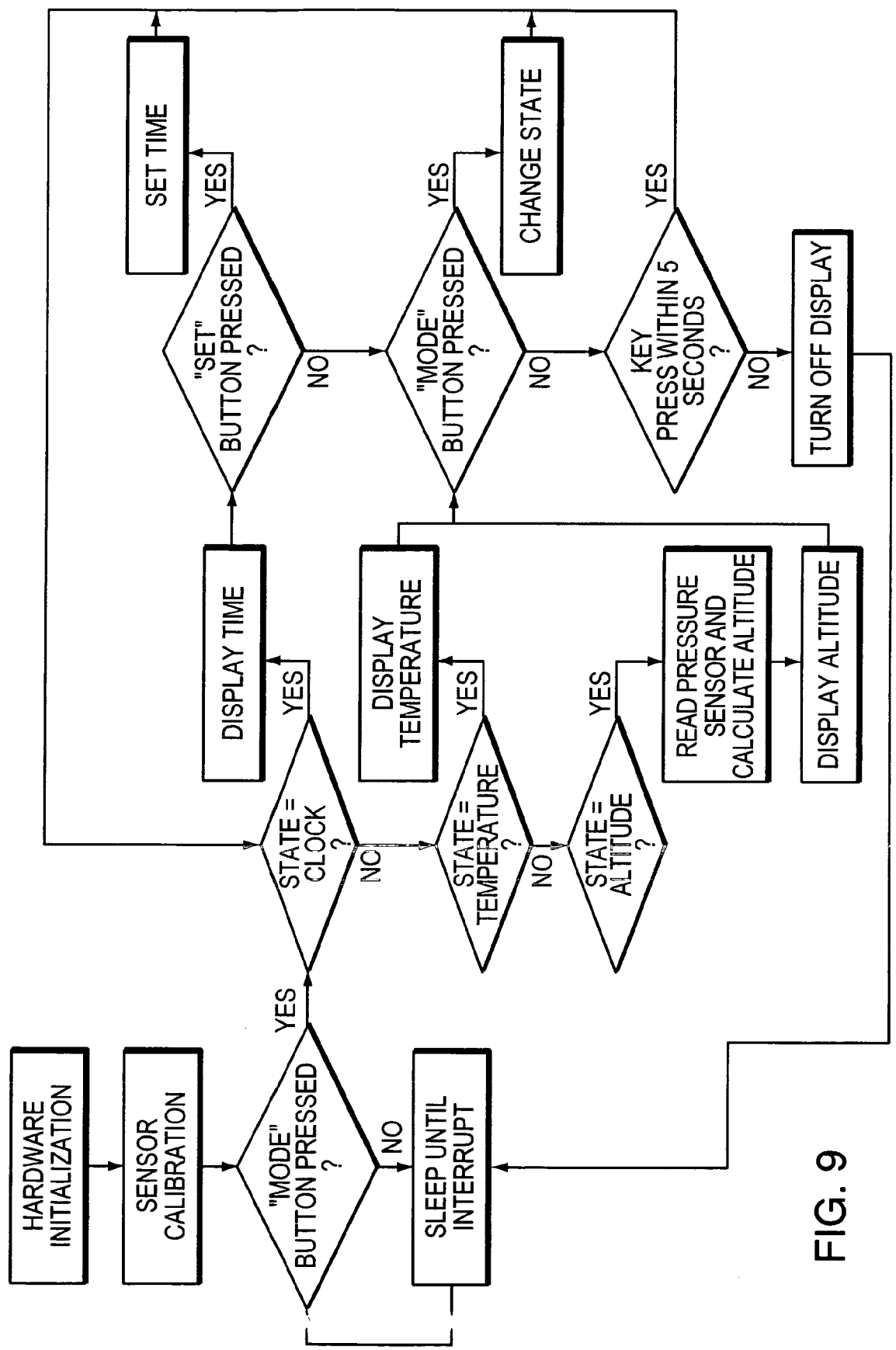
FIG. 9 is a flow diagram of steps, which may be implemented as firmware, directing the operation of an embodiment of the invention such as that illustrated in FIG. 7.
Figure 10A:
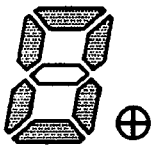
FIG. 10 shows a table of typical 7-segment LED display and the corresponding images of the present invention.
Figure 10A:
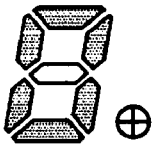
Figure 10A:
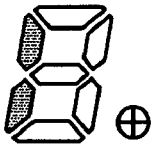
Figure 10A:
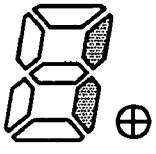
Figure 10A:
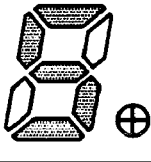
Figure 10A:
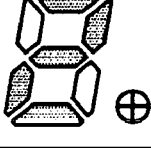
Figure 10A:
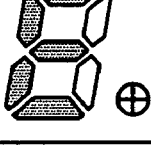
Figure 10A:
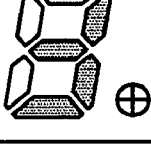
Figure 10A:
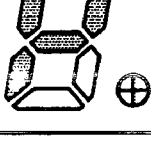
Figure 10A:
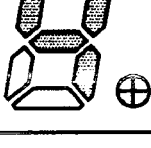
Figure 10A:
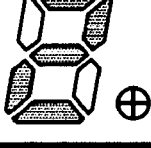
Figure 10A:
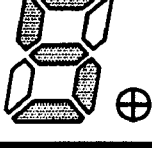
Figure 10B:
Figure 10B:
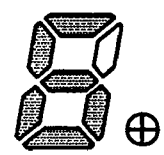
Figure 10B:
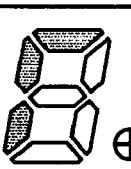
Figure 10B:
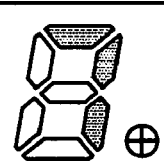
Figure 10B:
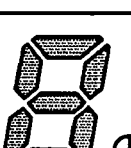
Figure 10B:
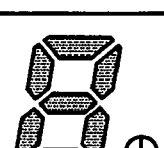
Figure 10B:
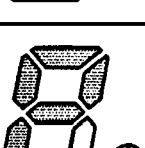
Figure 10B:
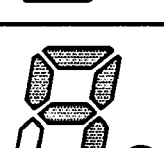
Figure 10B:
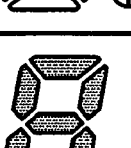
Figure 10B:
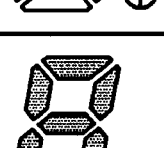
Figure 10B:
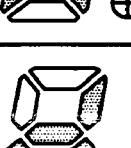
Figure 10B:
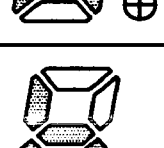
Figure 10B:
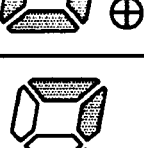
Figure 10B:
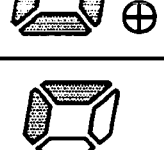
Figure 10D:
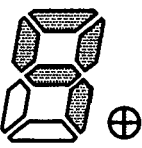
Figure 10D:
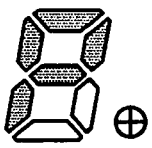
Figure 10D:
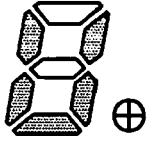
Figure 10D:
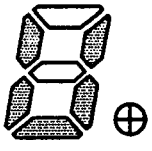
Figure 10D:
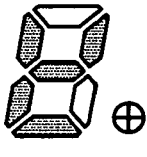
Figure 10D:
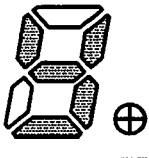
Figure 10D:
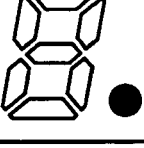
Figure 10D:
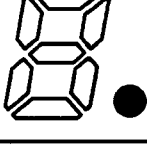
Figure 10D:
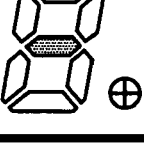
Figure 10D:
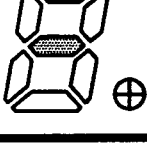

FIG. 9 is a flow diagram of steps, which may be implemented as firmware, directing the operation of an embodiment of the invention such as that illustrated in FIG. 7. Program code embodying the depicted steps essentially represents a simple state machine alternating between clock, temperature, and altitude modes, selectable with the external button. In its idle state, the microprocessor is in a low-power mode and the system is essentially 'sleeping' in order to conserve battery power. A single external button is used to 'wake up' the system and select the current display mode (in this embodiment, time, temperature, or altitude). If the button is not pressed within five seconds, the display will turn off and the system will re-enter its low-power mode. A second external button is used to set the current time-of-day when the system is in the 'time' mode displaying the clock.

Figure 10C:
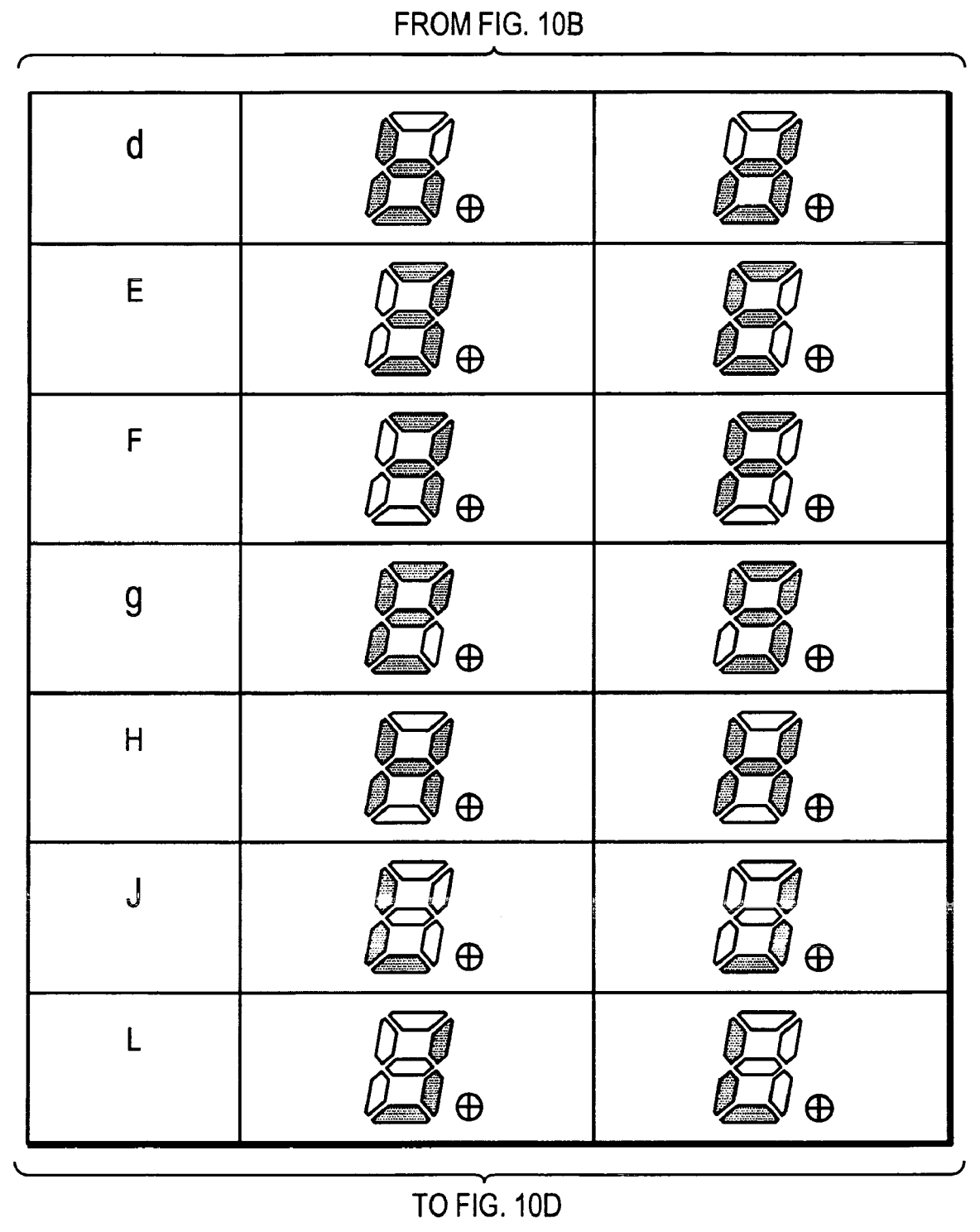

FIG. 10 shows a table of typical 7-segment LED display and the corresponding actual (what is displayed by the electronics) and virtual (what is seen by the user after reflection) images of the present invention. In the current embodiment, the characters on the actual display need only be reflected on the vertical axis in order for the virtual image to appear correctly. Depending on the mounting location of the electronic circuitry inside the apparatus, it may be necessary for the characters on the actual display to also be reflected on the horizontal axis (or only on the horizontal axis). Of course, the invention is by no means limited to the use of a 7-segment display; rather, any display technology whose optical emissions can be reflected, including but not limited to LEDs, liquid crystal displays (LCDs) and organic LEDs (OLEDs), is suitable.

The display is suitable for a wide range of applications including, without limitation, snowboard and ski goggles, casual sunglasses, bicycle helmets, and motorcycle goggles.

What is claimed is:

1. Eyeglasses with a projector projecting an image from the eyeglasses to the user's eyes, the eyeglasses including a conventional lens of a continuous curvature and an arm extending rearward from the lens, the arm being adapted to removably secure the eyeglasses to a user's head with the lens in front of a user's eye between the user's eye and the user's forward field of view when the eyeglasses are worn by the user, the lens having an inward side directed toward the user's eye and an outward side directed away from the user's eye, the improvement comprising a projector inward of the eyeglasses configured to project an image directly onto the inward side of the lens from which the image is reflected directly to the user's eye without intervening optics between the projector and the lens nor between the lens and the user's eyes.

2. The eyeglasses of claim 1 including a pair of lenses and an arm extending rearward from each of the lenses, the arms being adapted to removably secure the eyeglasses to a user's head with the lens in front of a user eye between the user's eye and the user's forward field of view when the eyeglasses are worn by the user, each lens having an inward side directed toward the user's eye and an outward side directed away from the user's eye, the lens generally configured side by side such that each is in front of a user's eye when the eyeglasses are worn by the user, the lenses joined together by a nose piece, further comprising a projector inward of the eyeglasses configured to project an image directly onto the inward side of at least one of the lenses from which the image is reflected directly to the user's eye without intervening optics between the projector and the lenses nor between the lenses and the user's eyes.

3. The eyeglasses of claim 2 wherein the lens is of constant thickness.

4. The eyeglasses of claim 2 wherein the lens is a corrective lens employed by the user for vision correction.

5. The eyeglasses of claim 1 wherein the image from the projector is modified as projected from the projector to compensate for the curvature of the lens such that the image is not distorted as viewed by the user.

6. The eyeglasses of claim 1 wherein said lens is symmetric in front of the user's eyes as worn by the user.

7. The eyeglasses of claim 1 comprising said lens is symmetric and said arms extend rearward from respective sides of said lens, the arms being adapted to removably secure the eyeglasses to a user's head with the lens in front of said user's eyes between the user's eyes and the user's forward field of view when the eyeglasses are worn by the user, further comprising said projector inward of the eyeglasses configured to project an image directly onto the inward side of said lens from which the image is reflected directly to the user's eye with no intervening optics between the lens and the user's eyes, wherein the image from the projector is modified as projected from the projector to compensate for the curvature of the lens such that the image is not distorted as viewed by the user.

8. The eyeglasses of claim 7 wherein the lens is a corrective lens employed by the user for vision correction.

* * * * *